United States Patent Office 2,905,690
Patented Sept. 22, 1959

2,905,690

VINYLATION OF OXAZOLIDINONES

William W. Bakke, Midland, Mich., assignor to The Dow Chemical Company, Midland, Mich., a corporation of Delaware No Drawing. Application April 14, 1958
Serial No. 728,094

6 Claims. (Cl. 260—307)

The present invention pertains to the organic chemical arts and has particular reference to a method for the direct vinylation of ring substituted 2-oxazolidinone compounds of the general structure:

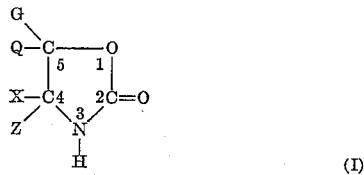

(I)

wherein G and Z are independently selected from the group consisting of aryl radicals (such as phenyl) that contain from 6 to about 10 carbon atoms, alkyl radicals that contain from 1 to about 4 carbon atoms and hydrogen; and Q and X are independently selected from the group consisting of alkyl radicals that contain from 1 to about 4 carbon atoms and hydrogen with the limitation that not more than three of the substituents G, Q, X and Z can be hydrogen, in order to prepare monoethylenically unsaturated monomeric ring substituted 2-oxazolidinone compounds of the formula:

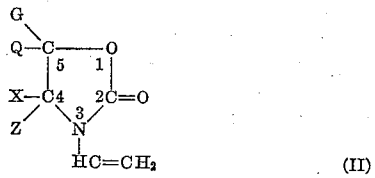

(II)

wherein G, Q, X and Z have the above-indicated values.

It has been reported in the literature and indicated in the art that the 2-oxazolidinone ring is not susceptible of being directly vinylated with acetylene. This is set forth in the Journal of Organic Chemistry, 22, 849 (1957) and German patent application B340321 Vb/12p (Klasse 12p Gruppe 3); filed 1–08/55—published 3–29/56.

It would be a great advantage, and it is the principal object of the present invention, to provide a direct method for the vinylation of ring substituted 2-oxazolidinone compounds of the Formula I in order to obtain such desirable and utile monomeric products as N-vinyl-5-methyl-2 - oxazolidinone, N-vinyl-5-ethyl-2-oxazolidinone, N-vinyl-5-phenyl-2-oxazolidinone, N-vinyl-4,5-dimethyl-2-oxazolidinone, N-vinyl-5,5-dimethyl-2-oxazolidinone and other of the ring substituted N-vinyl-2-oxazolidinone monomers of the Formula II. The various indicated ring substituted N-vinyl-2-oxazolidinone monomers and certain of their derivatives, particularly polymeric and resinous products, have great utility and provide for many advantages and benefits in numerous applications. Such monomers are generally liquids although certain species, such as N-vinyl-5-phenyl-2-oxazolidinone and the like, are normally solid substances. The monomers and their polymeric derivatives constitute valuable intermediates and agents for dyestuffs, textile assistants, plastics, as dye-receptors, and so forth.

In accordance with the present invention, N-vinyl-2-oxazolidinone monomers of the Formula II may advantageously be prepared by a direct method which comprises mixing a ring substituted 2-oxazolidinone starting compound of the Formula I with a suitable catalyst or catalyst-forming material, such as an alkali metal hydroxide or alcoholate or the elemental metal itself to form a salt of the 2-oxazolidinone, then subjecting the catalyzed mixture to the action of acetylene under a pressure between about 1 atmosphere and the decomposition pressure of the acetylene at the temperature of the reaction (generally about 60 atmospheres), more advantageously between about 7 and 40 atmospheres, at a temperature between about 90 and 200° C., more advantageously between about 120 and 160° C., until at least a portion of the starting material is converted to the desired monomeric product. While the use of higher acetylene pressures tends to favor the progress of the reaction, care should be taken to operate safely with regard to the explosive nature of the gas. Ordinarily, the use of too low a temperature hinders or precludes the reaction while too high a temperature causes decomposition of the reactants to occur.

Ordinarily, good conversions and yields of desired product from the converted starting materials can be realized according to the method of the invention within reaction periods of 24 hours or less, frequently within 8 hours. Thus, conversions in the neighborhood of 20 to 40 or more percent and greater and yields of from 50 to 90 percent and higher are not unusual. The desired monomeric ring substituted N-vinyl-2-oxazolidinone products can be recovered easily from the reaction mass using suitable known techniques, such as fractional distillation (advantageously under reduced pressure), by extraction with suitable solvents effective upon either the particular monomeric product involved or upon the undesired materials intended to be removed, recrystallization, precipitation, and so forth.

Among suitable catalysts there may be mentioned the hydroxides or alcoholates from lower alkyl alcohols of lithium, sodium, potassium, rubidium, etc, as well as the N-alkali metal salts of said starting 2-oxazolidinones. These salts may be obtained readily by reacting the elemental alkali metal of atomic number from 3 to 55 with liquid or molten starting material, or by causing a solution or suspension of the starting materials to react with alkali metal alcoholates (which, advantageously, are of alkyl alcohols of from 1 to about 4 carbon atoms, i.e., the lower alkyl alcohols). The use of the elemental alkali metals to form salts with the starting 2-oxazolidinones is generally a highly advantageous technique in the practice of the invention. The concentration of catalyst useful in the practice of the invention is from about 0.5 to 50 mole percent, advantageously from about 3 to 10 mole percent, of the metal or metal compound used or the metal salt formed therewith, based on the molar quantity of the starting 2-oxazolidinone being converted. The catalysts may also be used in admixture with organic bases (for example, pyridine) or such substances as the monovalent forms of copper, silver and gold, including (but not limited to) such salts as cuprous oxide, cuprous halides, silver acetate, silver nitrate, and so forth.

The reaction with acetylene is preferably conducted in a pressure tight vessel. Advantageously, the acetylene may be used in admixture with an inert gas, such as nitrogen. When the starting 2-oxazolidinone material is a normally liquid or easily molten substance it is generally unnecessary to employ any diluent or solvent vehicle in the reaction mass. If desired, however, such vehicles may be utilized. Suitable solvents for such purpose include the various aliphatic and aromatic hydrocarbons and ethers as typified by Skelly Solvent, benzene, toluene, dioxane, diethyl ether, vinyl and alkyl vinyl ethers, dimethyl formamide and the like. One of the desirable features of using a solvent is to permit dilution of the acetylene in the reaction mixture in the solvent vapors.

The invention is further illustrated in and by the following illustrative examples wherein, unless otherwise indicated, all parts and percentages are to be taken on a weight basis.

*Example "A"*

Into a three-neck, round bottom flask equipped with a stirrer, air condenser and inlet for nitrogen there was charged about 2.0 grams of elemental potassium metal and 101 grams of 5-methyl-2-oxazolidinone. The reaction mixture was stirred, under a blanket of nitrogen, with gentle warming, until all of the potassium had reacted to form the N-potassium salt of the starting 5-methyl-2-oxazolidinone.

The reaction mixture was then placed in a 0.35 liter stainless steel autoclave and saturated therein with acetylene under 200 p.s.i. pressure at room temperature. While maintaining the reaction mass pressed under acetylene, it was heated to about 170° C. and held at this temperature for about 6½ hours. After the termination of this period, the reaction mixture in the still sealed autoclave was permitted to cool overnight to room temperature. At the end of the cooling period, the pressure in the autoclave was found to be about 50 p.s.i. The autoclave was then vented and its contents removed, after which they were heated in vacuo (10 mm. Hg absolute pressure) at 80° C. to remove all remaining acetylene. Analysis of the reaction mass with N/10 iodine titration showed the presence of 21.7 percent of N-vinyl-5-methyl-2-oxazolidinone therein. Distillation of 83.5 grams of product gave 18.4 grams of monomeric N-vinyl-5-methyl-2-oxazolidinone boiling under 1.3 mm. Hg pressure at 78–81° C. The recovered monomer had a refractive index $(n_D{}^{25})$ of about 1.4810. Iodine titration indicated it to be at least 96 percent pure. Infrared analysis of the reaction product indicated that it contained about 20 percent N-vinyl-5-methyl-2-oxazolidinone and 52 percent recoverable and reusable 5-methyl-2-oxazolidinone.

*Example "B"*

About 115 grams (1 mole) of 5-ethyl-2-oxazolidinone, 7.45 grams (0.054 mole) of the sodium salt of 5-ethyl-2-oxazolidinone and 60 grams of dry benzene were placed into a 300 milliliter stainless steel autoclave. The reaction mixture was then saturated with acetylene at room temperature to a total pressure of about 200 p.s.i. The pressured mixture was then heated to about 150° C. and synthermally maintained thereat for about 4 hours. The pressure drop during the course of the reaction at 150° C. was from about 625 to 475 p.s.i. After cooling to room temperature, a pressure of about 150 p.s.i. remained in the autoclave. Distillation of the reaction product gave about 22.7 grams of monomeric N-vinyl-5-ethyl-2-oxazolidinone, 91 grams of unreacted 5-ethyl-2-oxazolidinone and 12.6 grams of higher boiling materials. Conversion of the starting 2-oxazolidinone was about 25 percent and yield of desired monomer product from converted starting materials was 62 percent.

*Example "C"*

The same apparatus used in the second example was charged with 152 grams of 5-methyl-2-oxazolidinone and 4.0 grams of sodium ethoxide. The charge was then saturated with acetylene at room temperature to 200 p.s.i., then heated to 150° C. and held at this temperature for about 3 hours. Distillation of the reaction mixture gave 23.7 grams of monomeric N-vinyl-5-methyl-2-oxazolidinone and 112 grams of 5-methyl-2-oxazolidinone. This yield of the vinyl monomer was 87 percent based on a 26 percent conversion of the starting 2-oxazolidinone material.

*Example "D"*

The general procedure of Example "C" was duplicated with a charge that consisted of 104 grams of 5-methyl-2-oxazolidinone, 2.8 grams of powdered potassium hydroxide and 43 grams of dry benzene with the exception that heating was continued for only 2 hours. Distillation of the reaction mixture produced 13.8 grams of monomeric N-vinyl-5-methyl-2-oxazolidinone and 75.2 grams of unreacted 5-methyl-2-oxazolidinone. About 28 per cent of the starting 2-oxazolidinone material to yield about 38 percent of monomer product, as based on converted starting material.

*Example "E"*

About 155 grams of 5-methyl-2-oxazolidinone, 9.2 grams of the sodium salt of 5-methyl-2-oxazolidinone, 1.25 grams of silver acetate and 50 milliliters of dry benzene were added to a 300 milliliter stainless steel autoclave and saturated therein at room temperature with acetylene under 200 p.s.i. The reaction mixture was heated at 150° C. for a 5 hour period during which time the pressure at reaction temperature dropped from about 600 to 340 p.s.i. Distillation of the reaction product gave 36 grams of N-vinyl-5-methyl-2-oxazolidinone and 105 grams of 5-methyl-2-oxazolidinone. The yield of the vinyl monomer was 58 percent based on a 32 percent conversion of 5-methyl-2-oxazolidinone.

Practically identical results were obtained when cuprous oxide was used in place of the silver acetate in a duplication of the foregoing procedure.

Excellent results analogous to those demonstrated are achieved when the foregoing is repeated to produce other of the vinyl monomers of the Formula II contemplated as being manufacturable by practice of the present invention using other catalysts and reaction conditions within its scope.

What is claimed is:

1. Method which comprises mixing (1) a ring substituted 2-oxazolidinone starting compound of the structural formula:

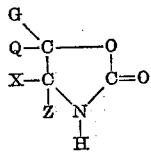

(I)

wherein G and Z are independently selected from the group consisting of aryl hydrocarbon radicals that contain from 6 to about 10 carbon atoms, alkyl radicals that contain from 1 to about 4 carbon atoms and hydrogen; and Q and X are independently selected from the group consisting of alkyl radicals that contain from 1 to about 4 carbon atoms and hydrogen with the limitation that not more than three of the substituents G, Q, X and Z are hydrogen with between about 0.5 and 50 mole percent, based on the molar quantity of the starting 2-oxazolidinone compound of the Formula I, of (2) a catalyst compound selected from the group consisting of alkali metals of atomic number from 3 to 55, hydroxides of said alkali metals, alcoholates from 1 to 4 carbon atom alkyl alcohols of said alkali metals, salts of said 2-oxazolidinone compounds of the Formula I with said alkali metals, and mixtures thereof; then subjecting said mixture to acetylene under a pressure between about 1 atmosphere and the decomposition pressure of acetylene at the temperature of reaction at a temperature between about 90 and 200° C. until at least a portion of said starting material is converted to a ring substituted N-vinyl-2-oxazolidinone monomer product of the formula:

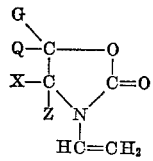
(II)

wherein G, Q, X and Z are as in Formula I.

2. The method of claim 1, wherein said pressure is between about 7 and 40 atmospheres and said temperature is between about 120 and 160° C.

3. The method of claim 1, wherein between about 3 and 10 mole percent of said catalyst compound (1) is mixed with said starting 2-oxazolidinone compound (2) of the Formula I.

4. The method of claim 1, wherein the starting compound is 5-methyl-2-oxazolidinone and the monomer product is N-vinyl-5-methyl-2-oxazolidinone.

5. The method of claim 1, wherein the starting compound is 5-ethyl-2-oxazolidinone and the monomer product is N-vinyl-5-ethyl-2-oxazolidinone.

6. The method of claim 1, wherein the starting compound is 5-phenyl-2-oxazolidinone and the monomer product is N-vinyl-5-phenyl-2-oxazolidinone.

References Cited in the file of this patent

UNITED STATES PATENTS

| | | |
|---|---|---|
| 2,317,804 | Reppe et al. | Apr. 27, 1943 |
| 2,806,847 | Nedwick | Sept. 17, 1957 |
| 2,806,848 | Nedwick | Sept. 17, 1957 |
| 2,818,362 | Drechsel | Dec. 31, 1957 |